(12) United States Patent
Lestage et al.

(10) Patent No.: US 8,267,164 B2
(45) Date of Patent: Sep. 18, 2012

(54) ENERGY RECOVERY AND HUMIDITY CONTROL

(75) Inventors: Marc Richard Lestage, Grand Barachois (CA); George Robert Lestage, Grand Barachois (CA); Patrick Paul Boudreau, Dieppe (CA)

(73) Assignee: Air Tech Equipment Ltd., New Brunswick (CA)

( * ) Notice: Subject to any disclaimer, the term of this patent is extended or adjusted under 35 U.S.C. 154(b) by 978 days.

(21) Appl. No.: 12/092,289

(22) PCT Filed: Oct. 25, 2006

(86) PCT No.: PCT/CA2006/001735
§ 371 (c)(1),
(2), (4) Date: May 1, 2008

(87) PCT Pub. No.: WO2007/051286
PCT Pub. Date: May 10, 2007

(65) Prior Publication Data
US 2008/0230206 A1    Sep. 25, 2008

Related U.S. Application Data

(60) Provisional application No. 60/732,778, filed on Nov. 2, 2005.

(51) Int. Cl.
*F28F 27/00* (2006.01)
*F24F 3/14* (2006.01)
*F24F 7/00* (2006.01)
*F24F 7/06* (2006.01)
*F25B 29/00* (2006.01)
*F28D 7/02* (2006.01)

(52) U.S. Cl. .......... 165/200; 165/222; 165/249; 165/59; 165/165; 454/234; 454/251

(58) Field of Classification Search .................. 165/200, 165/222, 223, 244, 249, 48.1, 59, 97, 108, 165/122, 136, 165, 166; 454/234, 239, 251, 454/252
See application file for complete search history.

(56) References Cited

U.S. PATENT DOCUMENTS 1,825,498 A * 9/1931 Wogan .......................... 165/157
(Continued)

FOREIGN PATENT DOCUMENTS

| DE | 298 08 861 | 3/1999 | | |
|---|---|---|---|---|
| JP | 04048136 A | * | 2/1992 | ...................... 165/59 |

OTHER PUBLICATIONS

Supplementary European Search Report for Application No. EP 06 79 0882 dated Apr. 29, 2010.

*Primary Examiner* — Ljiljana Ciric
*Assistant Examiner* — Travis Ruby
(74) *Attorney, Agent, or Firm* — Dinsmore & Shohl LLP

(57) ABSTRACT

A system and method for energy recovery and humidity control comprises an enclosure (12) with a plurality of ports (86,90,92,94,86) connected to a plurality of ducts (14,16,18, 20,22) The system has an enthalpy exchange core (136) exchanging heat and humidity between first air stream (35) and a second air stream (37), and a heat exchange sub-core (134) exchanging heat between the first air stream (35) and a third air stream (39), and fans (34,38,36) for circulating the first air stream (35), the second air stream (37) and the third air stream (39) respectively, and a controller (40) for controlling the fans (34,36,38) and regulating the flows of the first air stream (35), the second air stream (37) and the third air stream (39).

9 Claims, 9 Drawing Sheets

U.S. PATENT DOCUMENTS 3,666,007 A * 5/1972 Yoshino et al. ................. 96/144
4,843,786 A    7/1989 Walkinshaw
2005/0167077 A1 * 8/2005 Matsugi et al. ................. 165/4

* cited by examiner

ENERGY RECOVERY AND HUMIDITY CONTROL

RELATED APPLICATION

This application claims the benefits of U.S. Provisional Application No. 60/732,778, filed Nov. 2, 2005.

FIELD OF THE INVENTION

The present invention relates generally to environmental control systems for buildings. More particularly, the present invention relates to an energy recovery and humidity control system for a building.

BACKGROUND OF THE INVENTION

Some attempts have been made to provide environmental control systems and apparatus for buildings, for example:

U.S. Pat. No. 4,429,735 to Nomaguchi for a Simplified Air Conditioner includes a suction blower and an exhaust blower. The suction and exhaust blowers are driven by a common electric motor which is mounted between the blowers. The blowers are mounted in suction and exhaust passageways, respectively. The suction passageway crosses the exhaust passageway in a heat exchanger and is connected to an indoor exhaust port. This apparatus provides a rudimentary heat exchange between the intake and exhaust air streams, but fails to provide any environmental humidity control.

U.S. Pat. No. 6,752,713 to Johnson for a Cool Air Ventilation System shows a system of ducts which draw cool air from a ventilated basement or crawl space to an attic using a blower. The cool air flows into the attic through a vertical conduit and forces the attic air outside the building through exterior attic vents. This system fails to provide adequate humidity control in the living space between the basement and the attic.

U.S. Pat. No. 6,319,115 to Shinguki for an Air Cycle House and House Ventilation System shows a house having an indoor space which is enclosed and thermally insulated by an underfloor insulating space and a ceiling insulating space. Outdoor air is drawn into the indoor space from an air intake and air is expelled from a ceiling ventilation layer into an under roof space by a ventilation fan and then discharged outdoors. A heat exchanger mounted in the ceiling ventilation layer facilitates heat exchange between air in the ceiling ventilation layer and incoming fresh outdoor air. After the heat exchange process, the incoming air is delivered into the underfloor ventilation layer. However, this "air cycle house" has the disadvantage of requiring large spaces above and below the living space, e.g., ceiling ventilation space and underfloor ventilation space. The air from these spaces, which may be of inferior quality, may enter directly into the living space. Furthermore, this system also fails to teach the control of humidity.

U.S. Pat. No. 3,656,542 to Darm for a Ventilating System for Compartmental Buildings shows a simple air-to-air heat exchanger which supplies fresh air to regulate the delivery temperature of the air.

U.S. Pat. No. 4,590,990 to George for a Ventilation Heat Recovery System includes a shell and tube heat exchanger. Air is drawn from the ambient atmosphere into the shell for heat exchange flow counter to exhaust air that is drawn from the building atmosphere and forced through the heat exchanger tubes prior to exhausting to the atmosphere. An annular-shaped distribution channel includes distribution orifices for distributing incoming air into the building atmosphere.

Similarly, U.S. Pat. No. 4,794,980 to Raisannen for an Air-To-Air Heat Exchanger shows a heat exchanger which includes circular ducts with cone shaped turbulators. The turbulators are intended to enhance heat exchange between air flowing in a pair of concentric ducts.

Above referenced U.S. Pat. Nos. 3,656,542, 4,590,990 and 4,794,980 teach simple air-to-air heat exchange in a ventilation system with no concurrent control of the humidity in the air.

U.S. Pat. No. 4,040,804 to Harrison describes a heat and moisture exchanger consisting of a folded sheet of water permeable paper. Air is directed in one direction through the folds on one side of the folded paper. The return air flows in the opposite direction through the folds on the other side of the folded paper. Water and heat are simply transferred through the paper from one air stream to the other air stream flowing in the opposite direction.

U.S. Pat. No. 4,210,278 to Obler describes an apparatus for supplying conditioned air at a substantially constant temperature and humidity. A supply duct carries the supply air. A return duct is coupled to the supply duct for carrying return conditioned air. An air conditioner is coupled to the supply duct for decreasing the temperature of the supply and return conditioned air. A by-pass duct is coupled to the supply duct for selectively directing portions of the supply and return conditioned air around the air conditioner. Another bypass duct is coupled to the return duct for selectively directing portions of the return conditioned air around the supply duct and the temperature reducing device. Although controller devices are used to control the flow and amount of mixing of the supply and return conditioned air flowing through the air conditioner and within the supply duct, no heat or humidity exchanger is used.

U.S. Pat. No. 6,131,653 to Larsson describes an air dehumidifying and conditioning system which draws incoming air through a fan and uses heat from the fan and fan motor to heat air discharged from the fan. The system then divides air discharged from the fan into a supply stream and a scavenge stream. The supply stream is passed through a pre-cooler and an air cooler for cooling and dehumidification. The dehumidified air of the supply stream is then heated by passing through a heat exchanger, with the heating by the heat exchanger being accomplished using the scavenge stream. The dehumidifying function of this system relies solely on the air cooler, and does not use any humidity exchanger.

U.S. Pat. No. 6,622,508 to Dinnage et al teaches an apparatus and method for heat and humidity exchange between two air streams, one hot and one humid. A first air stream is fed from the interior of a building to the ambient air and a second air stream is fed from the ambient air to the interior of the building. The first air stream is cooled and transferred through a heat exchanger, to a heater and a dehumidifier before being exhausted to the ambient air. The second air stream is transferred through the dehumidifier and the heat exchanger, whereupon it is cooled in a cooling device before being transferred into the interior of the building. Before being fed to the dehumidifier, the second air stream is caused to exchange heat and humidity with the first air stream before the latter is fed into the heat exchanger. This method, by using a regular heat exchanger attached to a dehumidifier, however, limits the heat exchange stage and the humidity exchange stage in series, thereby requiring the use of additional cooling functions. Furthermore, due to the serial design of this apparatus it is difficult to control the enthalpy exchange and the heat exchange separately by using, for example, an electronic controller.

U.S. Pat. No. 5,092,520 to Lestage, relates to an air extraction apparatus for conditioning air in an enclosed space. The air in the enclosed space is stratified due to a temperature gradient between a ceiling and a floor of the enclosed space. The apparatus has a conduit with an inlet end and an outlet end. The conduit may be arranged and installed with its outlet end in communication with an opening in a wall of the enclosure and its inlet end in proximity to the floor when in use. A fan may be used in the conduit to effect movement of air from the floor level of the enclosure through the inlet end to and outwardly of the outlet end. A controller is used to control the operation of the fan by being responsive to a selected condition, e.g., relative humidity of the air in the enclosure.

Building construction methods and materials currently in use, especially the increased utilization of thermal insulation layers and moisture barriers have resulted in more air-tight construction to the point where supplementary ventilation has become a necessity in order to maintain air quality and humidity control within a building. This condition exists both in new building construction, or after building renovation using the state-of-the-art standards and technologies which result in relatively air-tight construction. Such air-tight building construction may cause interior environment problems.

The natural movement, or infiltration of hot humid air, from either the outside of a building or from upper levels of a building into a lower level of the building, for example, basement or crawl space, where temperatures are lower, can lead to condensation causing mold formation and odors, with resultant health issues as well as structural damage. For example, infiltration of the humid warm air into wall cavities during the summer, which is caused by constant cooling of the air mass, and the reduction in volume of the air mass, with resulting prolonged negative air pressure within the building, can result in mold formation. Mold and mildew conditions are considered health hazards and are considered to contribute to various respiratory conditions, including asthma, especially in children.

The infiltration of warm humid air may also result in increased air conditioning requirements with increased energy usage.

Current building ventilation systems do not address the issues related to negative air pressure within a building. These current building ventilation systems have a negligible ability to mitigate the effects of basement and crawl space humidity and condensation, especially during periods of high outdoor temperature and humidity.

Dehumidifiers are often used to address localized humidity problems. However, these devices are costly to operate and they do not address the issues of indoor air quality.

As well, during periods of prolonged and extreme conditions of high humidity or temperature, either hot or cold, the temperature and humidity levels of the air supply delivered by the ventilation system is such that the operation of the system requires expenditure of significant energy and cost in order to maintain reasonable levels of comfort Therefore, despite the developments of the prior art, there remains a need for an effective and efficient heat transfer, humidity and ventilation control apparatus for use in buildings. In particular, there is an unmet need for a balanced air circulation system using the basement's natural environment which controls humidity, enables efficient energy recovery from air conditioning and heating systems, and boosts the energy efficiency of air conditioning and humidity control systems during outside conditions of high temperature and high humidity while providing the necessary ventilation requirements.

BRIEF SUMMARY OF THE INVENTION

In accordance with one aspect of the present invention, an energy recovery and humidity control system comprising an enclosure is provided. The enclosure comprising: a plurality of ports capable of connecting to a plurality of ducts; a heat exchange sub-core defining a first part of a first path for a first air stream, and a second path for a second air stream; the first path and the second path being capable of exchanging heat between the first air stream and the second air stream; an enthalpy exchange core defining a second part of the first path for the first air stream, and a third path for a third air stream; the first path and the third path being capable of exchanging heat and humidity between the first air stream and the third air stream; fans for circulating the first air stream, the second air stream and the third air stream; and a controller for controlling the fans and regulating the flows of the first air stream, the second air stream and the third air stream.

Preferably, the first part and the second part of the first path are in tandem, and the first path is in communication with a first port of the plurality of ports and a second port of the plurality of ports.

Preferably, the second path is in communication with a third port of the plurality of ports and a fourth port of the plurality of ports, and the third path is in communication with the third port and a fifth port of the plurality of ports.

Preferably, the first port is receiving fresh air supply, and the second port is supplying air.

Preferably, the third port is receiving air from a space with lower temperature or humidity, the fifth port supplying heat exchanged air to the space with lower temperature or humidity, and the fourth port is exhausting air.

Preferably, the heat exchange in the heat exchange sub-core occurs by utilizing cross-flow of the first air stream and the second air stream.

Preferably, the heat and humidity exchange in the enthalpy exchange core occurs by utilizing cross-flow of the first air stream and the third air stream.

Preferably, the enthalpy exchange core further comprises a plurality of vertically oriented corrugated layers, and a plurality of horizontally oriented corrugated layers, each of the layers being defined by a plurality of angularly disposed wall portions and moisture permeable sheets, the wall portions and the moisture permeable sheets defining a plurality of channels.

Preferably, the heat exchange sub-core further comprises a plurality of vertically oriented layers, each of the plurality of vertically oriented layers having a plurality of vertical channels; a plurality of horizontally oriented layers; each of the plurality of horizontally oriented layers having a plurality of horizontal channels, each of the channels defined by a first impermeable sheet, a second impermeable sheet and a pair of spaced apart wall portions; said first impermeable sheet and said second impermeable sheet allowing transfer of heat between the vertically oriented plurality of layers and the horizontally oriented plurality of layers.

In accordance with another embodiment of the present invention, there is provided a method for recovering energy and humidity control comprising the steps of: creating a first air stream from an environment to a first space requiring fresh air supply; creating a second air stream re-circulating a second space with lower temperature or humidity; creating, in parallel to the second air stream, a third air stream from the second space with lower temperature or humidity to the environment for exhausting air; coordinating the first air stream with the second air stream for heat exchange; and coordinating the first air stream with the third air stream for enthalpy exchange.

Preferably, the heat exchange and the enthalpy exchange are in tandem.

Preferably, the heat exchange occurs by utilizing cross-flow of the first air stream and the second air stream.

Preferably, the enthalpy exchange occurs by utilizing cross-flow of the first air stream and the third air stream.

Preferably, the enthalpy exchange is through a plurality of vertically oriented corrugated layers, and a plurality of horizontally oriented corrugated layers, each of the layers being defined by a plurality of angularly disposed wall portions and moisture permeable sheets, the wall portions and the moisture permeable sheets defining a plurality of channels.

Preferably, the heat exchange is through a plurality of vertically oriented layers, each of the plurality of vertically oriented layers having a plurality of vertical channels; and a plurality of horizontally oriented layers; each of the plurality of horizontally oriented layers having a plurality of horizontal channels, each of the channels defined by a first impermeable sheet, a second impermeable sheet and a pair of spaced apart wall portions; said first impermeable sheet and said second impermeable sheet allowing transfer of heat and moisture between the vertically oriented plurality of layers and the horizontally oriented plurality of layers.

BRIEF DESCRIPTION OF THE DRAWINGS

The invention and the illustrated embodiments may be better understood, and the numerous objects, advantages, and features of the present invention and illustrated embodiments will become apparent to those skilled in the art by reference to the accompanying drawings. In the drawings, like reference numerals refer to like parts throughout the various views of the non-limiting and non-exhaustive embodiments of the present invention, and wherein.

DETAILED DESCRIPTION OF THE INVENTION

The present invention overcomes the disadvantages of the prior art by providing a system, using a cooler space's natural environment, which controls humidity, enables efficient energy recovery from air conditioning and heating systems, and boosts the energy efficiency of air conditioning and humidity control systems during outside conditions of high temperature and high humidity while providing the necessary ventilation requirements.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention pertains.

The term "duct" is intended to include any conduit, passage, pipe, tube or other elongated hollow body capable of carrying air. A duct may be formed by any type of suitable duct material, for example but not limited to, sheet metal, plastic, or the like.

The term "fan" is intended to include any instrument or device for producing a current of air, for example but not limited to, any device that comprises a series of vanes radiating from a hub rotated on its axle by a motor.

The term "cross flow" is intended to describe the direction of fluids, in the present invention the directions of the air, are substantially perpendicular to each other. However, it should be apparent to a person skilled in the art that the air flows of the present invention are not limited to form a cross-flow. Other examples with various degrees of efficiency may include, but not limited to, counter flow, parallel flow, or any other arrangement.

Enthalpy may be determined from a given dry-bulb temperature and a given relative humidity value, the humidity value is in turn determined by the atmospheric pressure and the partial pressure of water vapor.

Figure 1:
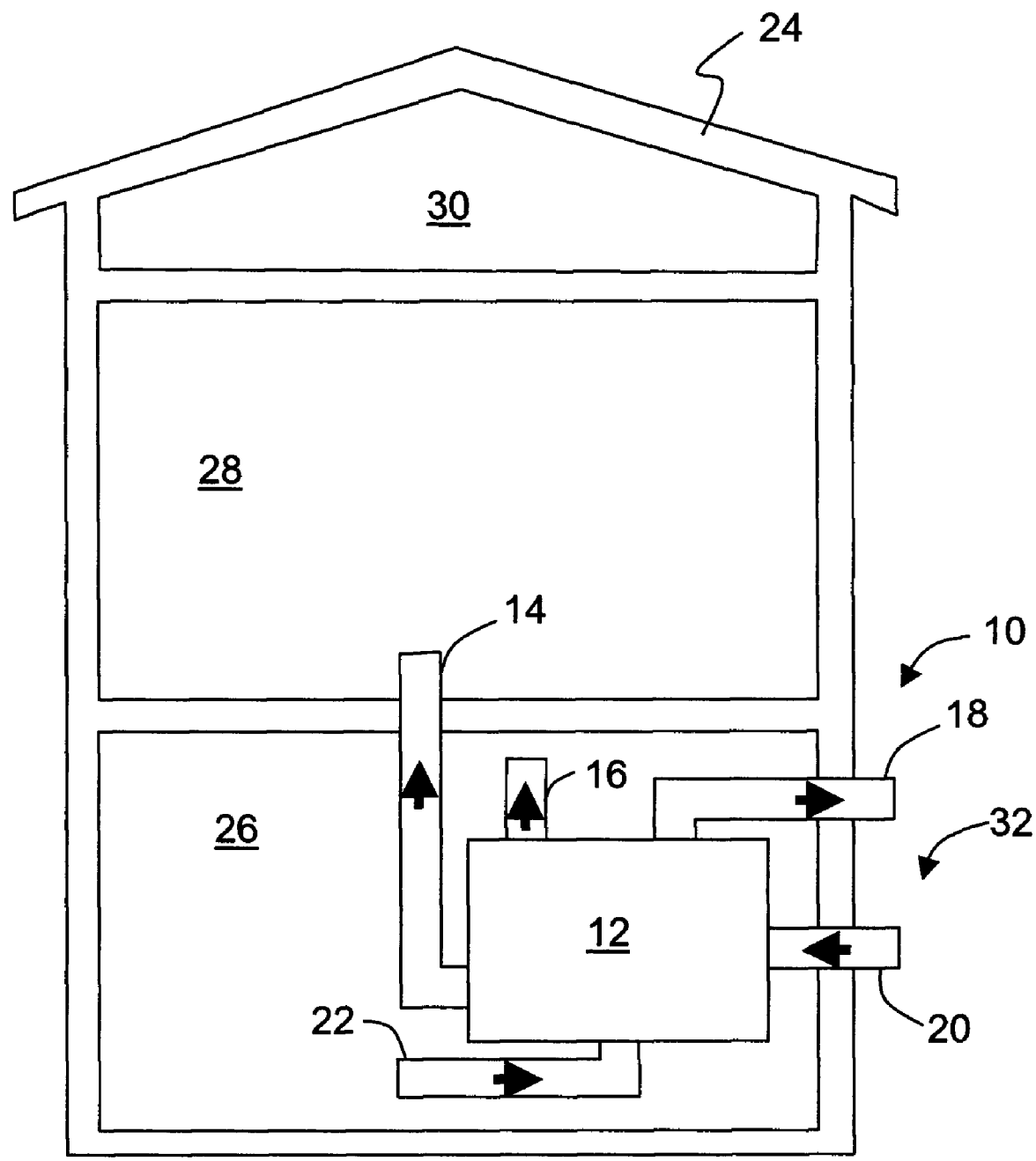
FIG. 1 is a schematic view showing an energy recovery and humidity control system according to one embodiment of the present invention with the system shown installed in a house.
Figure 2:
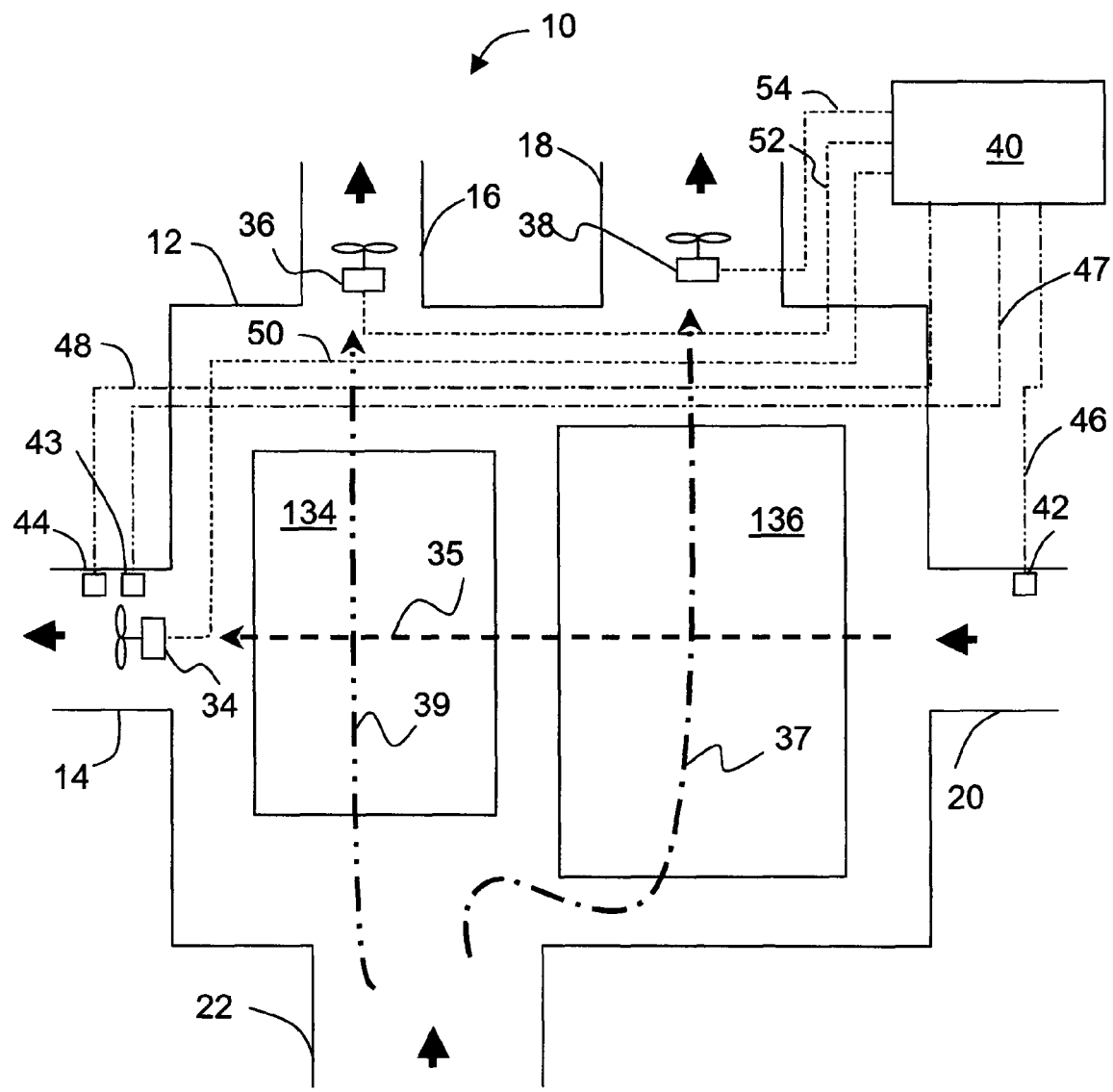
FIG. 2 is a schematic view showing the enclosure of the system in isolation and showing the various duct and sensor connections.

With reference to the drawings, there is shown in FIGS. 1 and 2 a schematic view of an energy recovery and humidity control system 10 according to the present invention. The energy recovery and humidity control system 10 includes an enclosure 12 which contains a enthalpy exchange core and a heat exchange sub-core and a plurality of ducts 14, 16, 18, 20, 22, the connection and function of which will be described presently.

For purposes of illustration, FIG. 1 shows a system 10, in accordance with one embodiment of the present invention, installed in a dwelling 24 which includes, a first space 28, a second space 26 and an attic 30, the second space having a general lower temperature, for example but not limited to, a basement, a crawl space, or a cellar; the first space 28 having a higher temperature, for example but not limited to, a ground floor living space. The enclosure 12 may be disposed in the second space 26. A first duct 14 may lead from the enclosure 12 to the first space 28, or any other apparatus for further treatment, and supplies air which has been treated in the enclosure 12 in accordance with one embodiment of the present invention.

A second duct 16 leads from the enclosure to the second space 26 for recirculation. A third duct 18 leads from the enclosure 12 to the outside 32 of the dwelling 24 to exhaust air from the enclosure 12 to the outside. A fourth duct 20 leads from the outside 32 to the enclosure 12 for the purpose of receiving outside air from the ambient environment outside 32 of the dwelling 24. A fifth duct 22 enables the enclosure 12 to receive air from the basement second space 26.

Referring to FIGS. 1 and 2, the internal details of construction within the enclosure 12 have been omitted for purposes of clarity of illustration. However, FIG. 2 shows that the movement of air through the enclosure 12 is controlled by a first blower 34 mounted in communication with the first duct 14 resulting in a first air stream 35, a second blower 36 mounted in communication with the second duct 16 resulting in a third air stream 39 and a third blower 38 mounted in communication with the third duct 18, resulting in a second air stream 37. The operation of the blowers 34, 36, 38 is controlled by a controller 40 which may be mounted on the enclosure 12. The operation of the controller 40 will be described later.

A temperature sensor 42 may be mounted in the fourth duct 20 and is connected to the controller 40 via lead 46. First duct 14 has a temperature sensor 43, and a humidity sensor 44. The sensors are connected to the controller 40 via leads 47 and 48.

Supply fan 34, re-circulating fan 36, and exhaust fan 38 are each electrically operated and are connected to the controller 40 via the leads 50, 52, 54, respectively.

Figure 3:
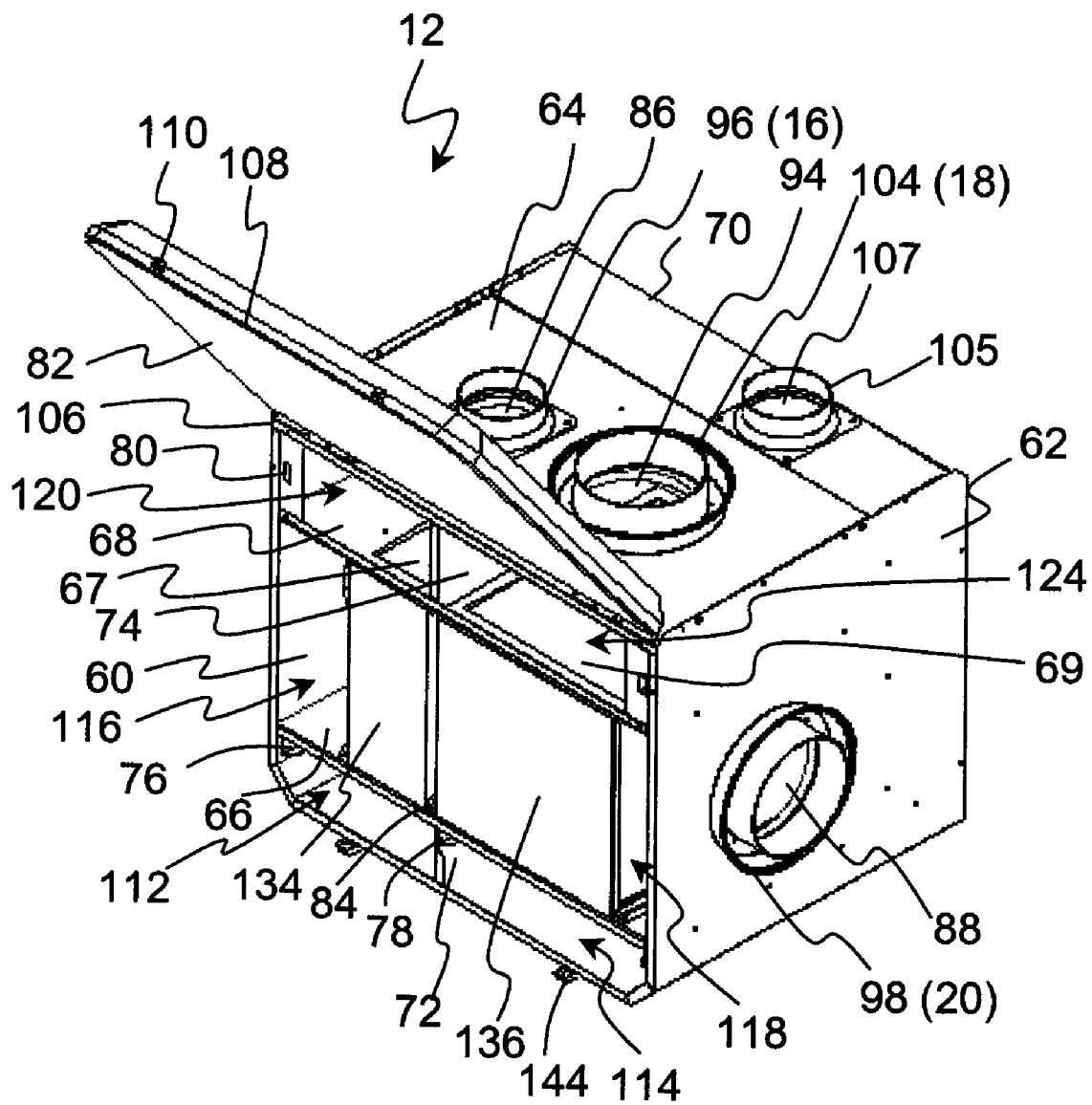
FIG. 3 is a top front perspective view of the enclosure of the system with the front cover shown in the open position.
Figure 4:
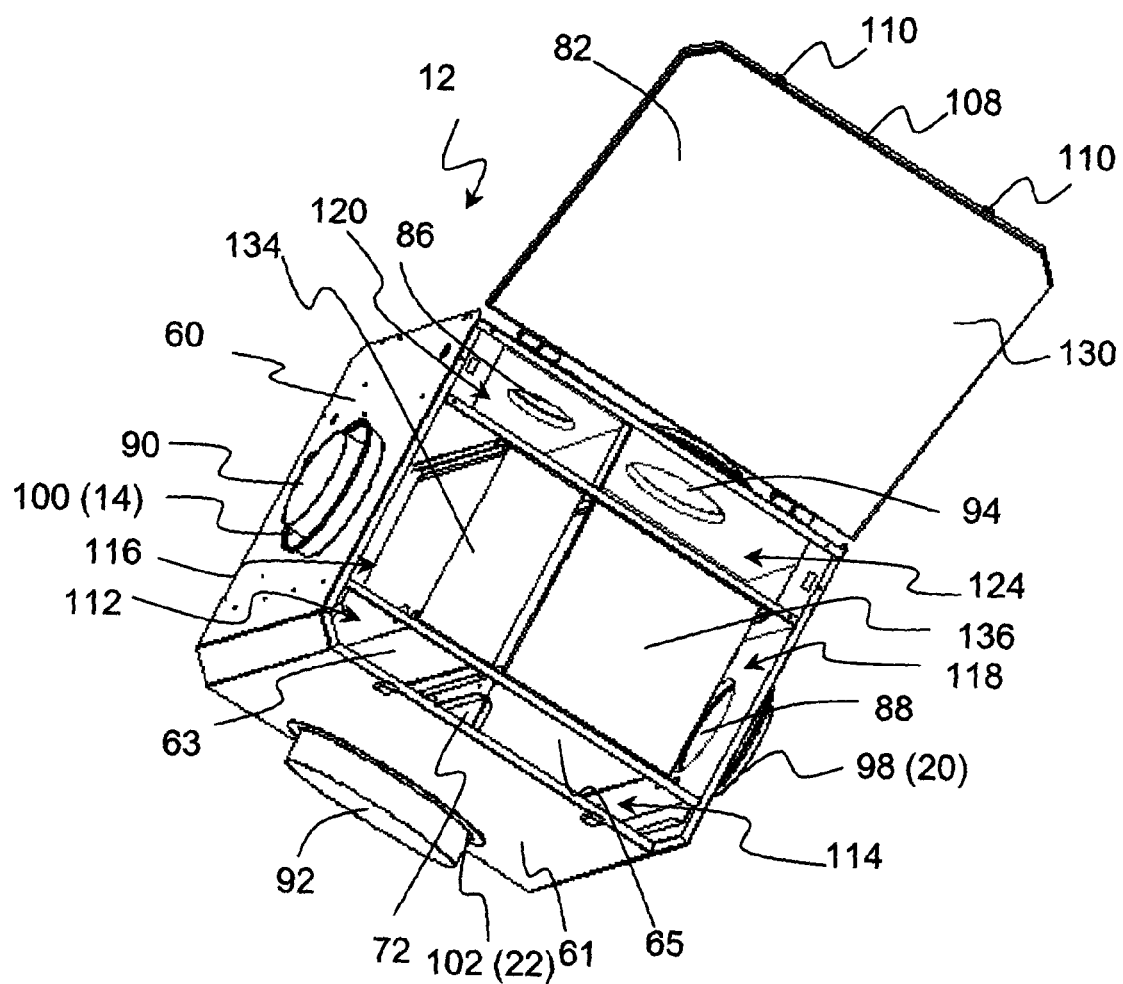
FIG. 4 is a bottom front perspective view of the enclosure similar to FIG. 3 showing the underside of the enclosure.
Figure 5:
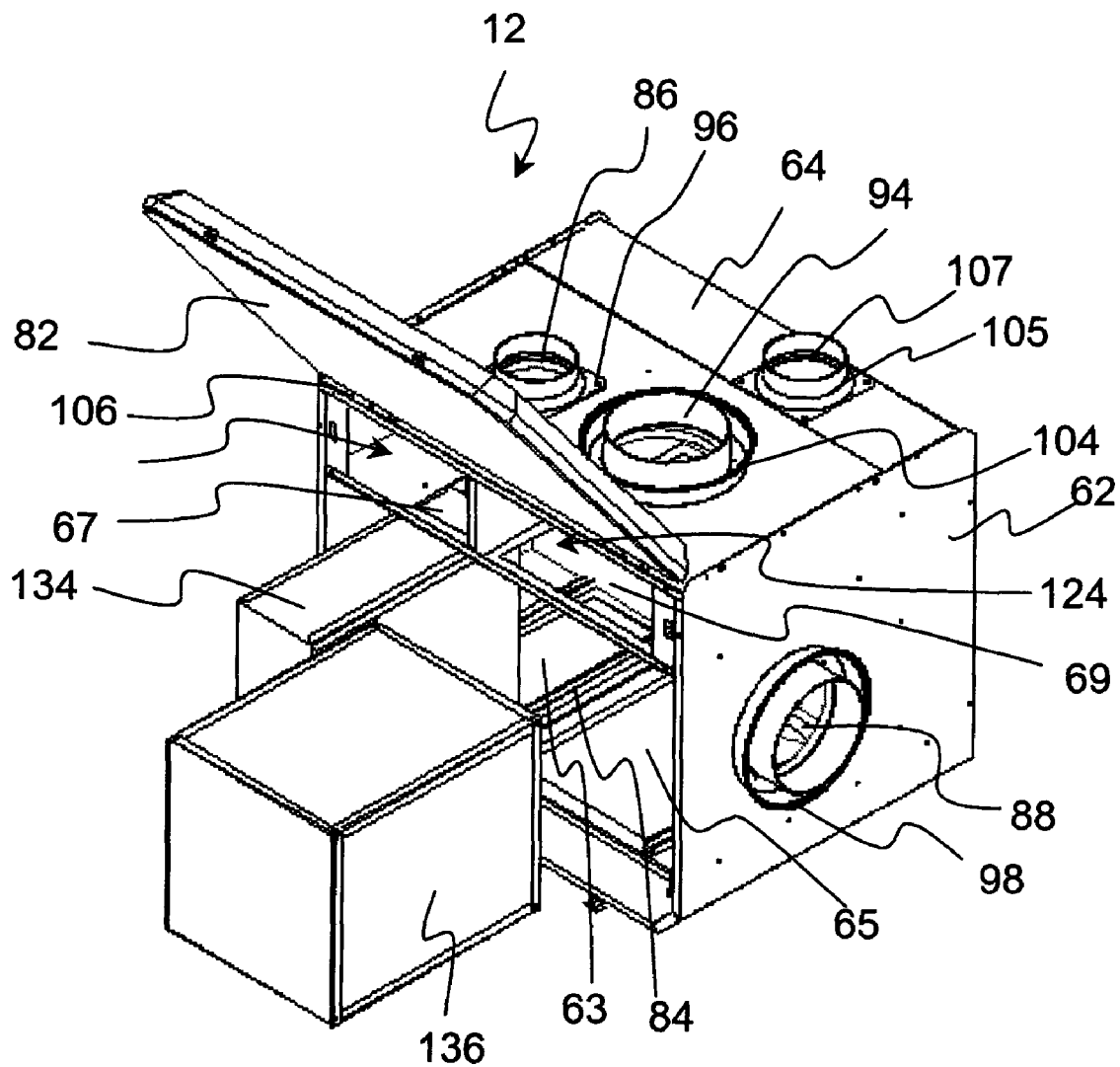
FIG. 5 is a partially exploded view generally similar to FIG. 3 showing the enthalpy exchange core and the heat exchange sub-core illustrated schematically as impermeable rectangular blocks and shown extending from the enclosure.

The details of construction of the enclosure 12 are shown in FIGS. 3, 4 and 5.

The enclosure 12 includes a pair of side walls 60, 62, a top wall 64, and a bottom wall 61, bottom horizontal core support 66, and a top horizontal core support 68 hold a heat transfer sub-core 134 and an enthalpy core 136. The enclosure 12 also includes a removable back panel 70, a lower divider 72, an upper divider 74, a side filter supports 76, a middle filter support 78, a corner sensor bracket 80 for sensing the closure of the door, a door 82, and a core support 84 that holds the enthalpy exchange core 136 and the heat exchange sub-core 134 in place. The bottom horizontal core support 66 has two openings 63, 65, and the top horizontal core support 68 has two openings 67, 69 for allowing air flow through the heat exchange sub-core 134 and the enthalpy exchange core 136, from the port 92 to ports 86 and 94, respectively. As can be seen in FIG. 4, the port 92 straddles the divider 72 so that the intake air from port 92 is divided between the enthalpy exchange core 136 and the heat exchange sub-core 134.

The enclosure 12 also includes a plurality of ports 86, 88, 90, 92, 94; each of which has a connector 96, 98, 100, 102, 104.

The connectors 96, 98, 100, 102, 104 connect the enclosure 12 to the various ducts 16, 20, 14, 22, 18 respectively, (as shown in parentheses) and which have been described in FIGS. 1 and 2.

The enclosure 12 may further have an optional spare port 107 with a connector 105, which may be used to connect to the second space 26 for exhaust purpose (not illustrated in FIG. 1).

The door 82 is connected to the top wall 64 by a hinge 106. The edge 108 of the door 82 is connected to the enclosure 12 by a pair of latches 110 and latch clips 144.

Foam interlays, for example, a bottom left foam interlay, a bottom right foam interlay, a lower side foam interlay, a lower rear foam interlay, an upper left rear interlay, an upper right rear interlay, a top right foam interlay, an upper side foam interlay, a top left foam interlay, may be inserted into the spaces 112, 114, 116, 118, 120, and 124. The door 82 may also include door foam insulation layer 130, and a door foam inner layer (not shown). The various foam layers may therefore cover all of the inner surfaces of the enclosure 12 and provide both thermal and acoustic insulation.

Figure 6:
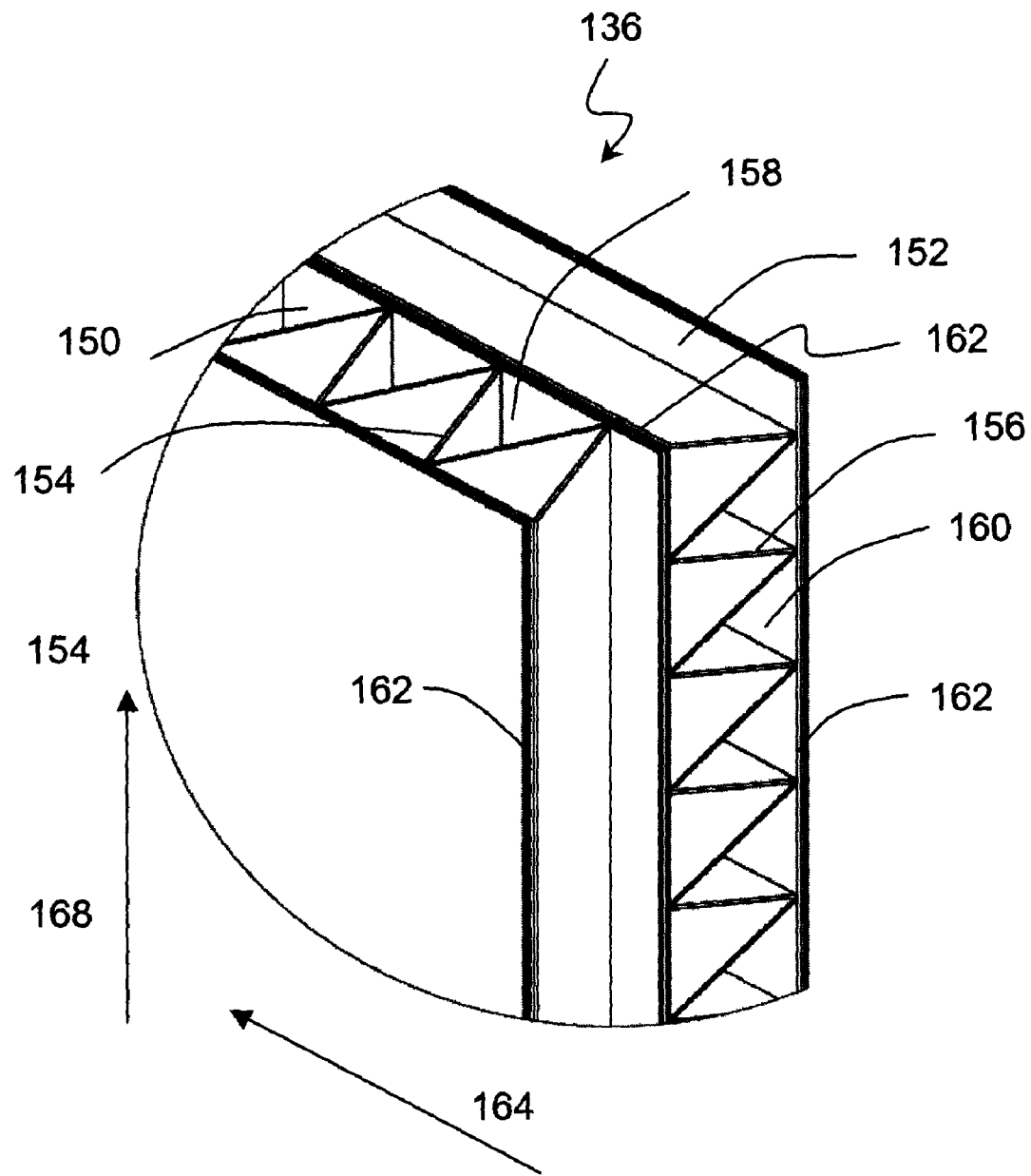
FIG. 6 is an enlarged fragmentary portion of the perspective view of FIG. 5 showing a fragmentary perspective view of the enthalpy exchange sub-core.

Referring to FIG. 6, a cutout of the enthalpy exchange core is shown. The enthalpy exchange core 136 comprises a plurality of sequential first and second passages, comprising a first plurality of vertically oriented, fluted or corrugated passages 150 and a second plurality of horizontally oriented, fluted or corrugated passages 152. Each of the passages 150, 152 is defined by a plurality of inclined connecting wall portions which are denoted typically by reference numbers 154, 156. The wall portions 154, 156 partially define a plurality of channels 158, 160. The channels 158, 160 are further defined by sheets 162 of moisture permeable material which may include adhesive material for attachment of the moisture permeable sheets 162 to the corrugated passages 150, 152. It will be understood that the respective passages 150 and 152 need not be precisely vertical or horizontal, but are preferably normal to one another, and "horizontal" and "vertical" are terms used to indicate relative orientation.

The moisture permeable material 162 may be any material which is permeable to moisture, preferably a polymer material. The corrugated passages 150, 152 may be made of any material which permits passage of moisture, also preferably a polymer material.

The enthalpy exchange core 136 forms a cross-flow, air-to-air type of heat exchanger and allows heat to be exchanged between a first air stream flowing in a first path, for example, the horizontal direction as indicated by the arrow 164 in FIG. 6 and a second air stream flowing in a second path, for example, vertical direction as indicated by the arrow 168 in FIG. 6. The enthalpy exchange core 136 allows heat to be exchanged between the two air streams; however, the two air streams do not mix to any significant degree.

In the enthalpy exchange core 136, moisture can also be transmitted between the two air streams.

The enthalpy exchange core 136 therefore transfers latent and sensible energy from one air stream to the other without transferring air through its medium, thus preventing mixing of the two air streams.

Figure 7:
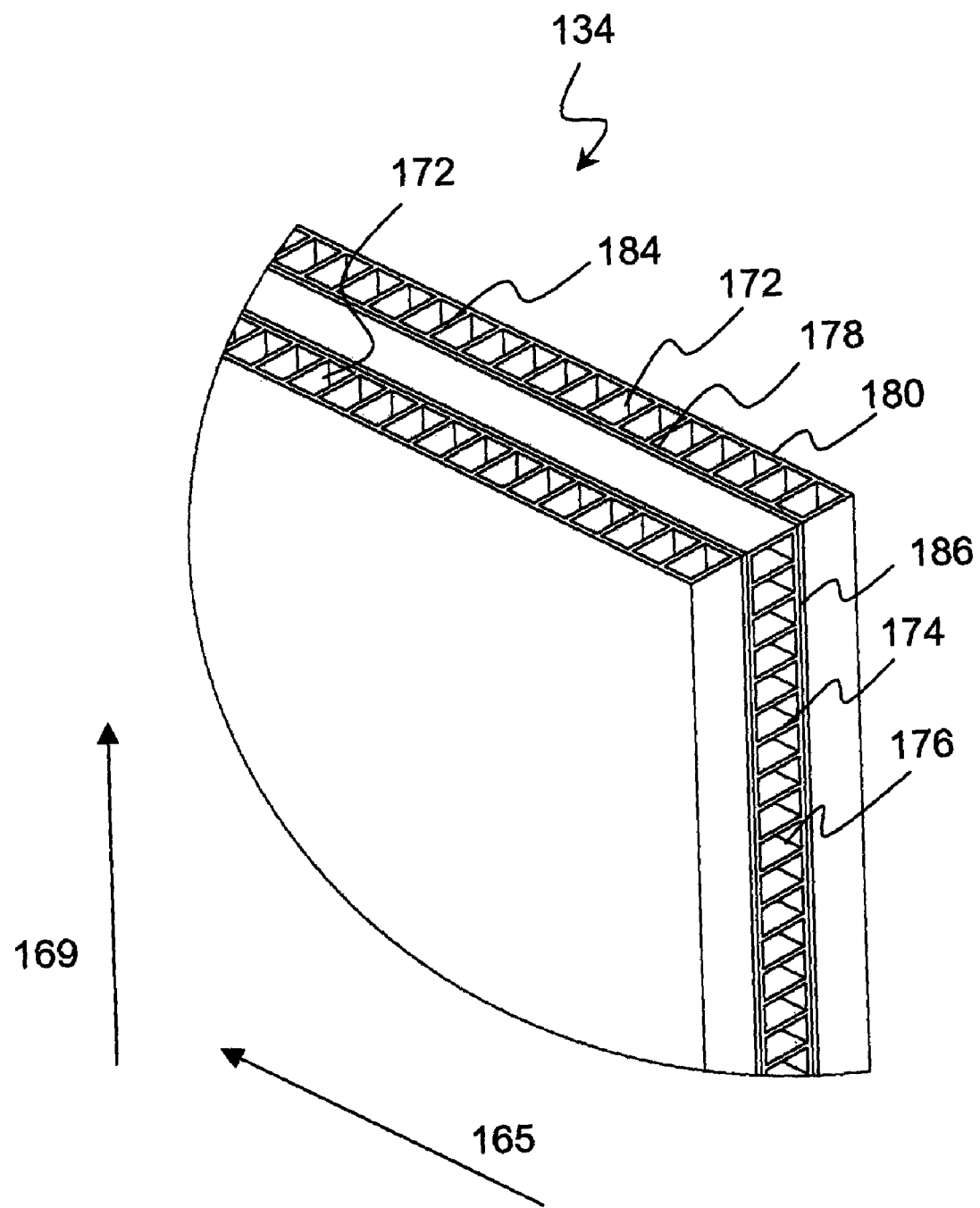
FIG. 7 is an enlarged fragmentary portion of the perspective view of FIG. 5 showing a fragmentary perspective view of the heat exchange core.

It should be apparent to a person skilled in the art that many types of material may be used for the enthalpy exchange core for exchange heat and moisture without mixing the air streams. One example of a polymer membrane is made by Dais Analytic and used in their ConsERV™ energy recovery products. Referring to FIG. 7, the heat exchange sub-core 134 comprises a vertically oriented plurality of layers 170 each of which has a plurality of nominally vertical channels 172 and a normally horizontally oriented plurality of layers 174 each of which has a plurality of horizontal channels 176. Each of the channels 172, 176 is typically defined by a first air impermeable sheet 178, a second air impermeable sheet 180 and a pair of spaced apart wall portions denoted typically by the reference numbers 174, 184. Adjacent layers 178, 180 may be connected by an adhesive layer 186. The air impermeable sheets 178 and 180 may be any material which is impermeable to moisture, preferably a plastic material.

The heat exchange sub-core 134 forms a cross-flow, air-to-air type of heat exchanger and allows heat to be exchanged between a first air stream flowing in a first path, for example, in the horizontal direction as indicated by the arrow 165, i.e. duct 20 (outside) to duct 14 (living space) in FIG. 7; and a second air stream flowing in a second path, for example, the vertical direction as indicated by the arrow 169, i.e. duct 22 (basement in) to duct 16 (basement out), in FIG. 7. The heat exchange sub-core 134 allows heat to be exchanged between the two air streams; however, the two air streams do not mix and the moisture barrier sheets 178, 180 prevent the transfer of moisture between the two air streams.

The heat exchange sub-core 134 therefore transfers sensible energy from one air stream to the other without transferring air through its medium, thus preventing the mixing of the two air streams. It should be apparent to a person skilled in the art that many types of material may be used for the heat exchange sub-core, for example, Coroplast™ corrugated plastic sheets.

It should be apparent to a person skilled in the art that the first path and the second path in the heat exchange sub-core 134, and in the enthalpy exchange core 136, are not limited to form a cross-flow. Other examples with various degrees of efficiency may include, but not limited to, counter flow, parallel flow, or any other arrangement. For example, but not limited to, a tube and fin, or a tube-in-tube arrangement may result in a substantially similar heat exchange function.

Figure 8A:
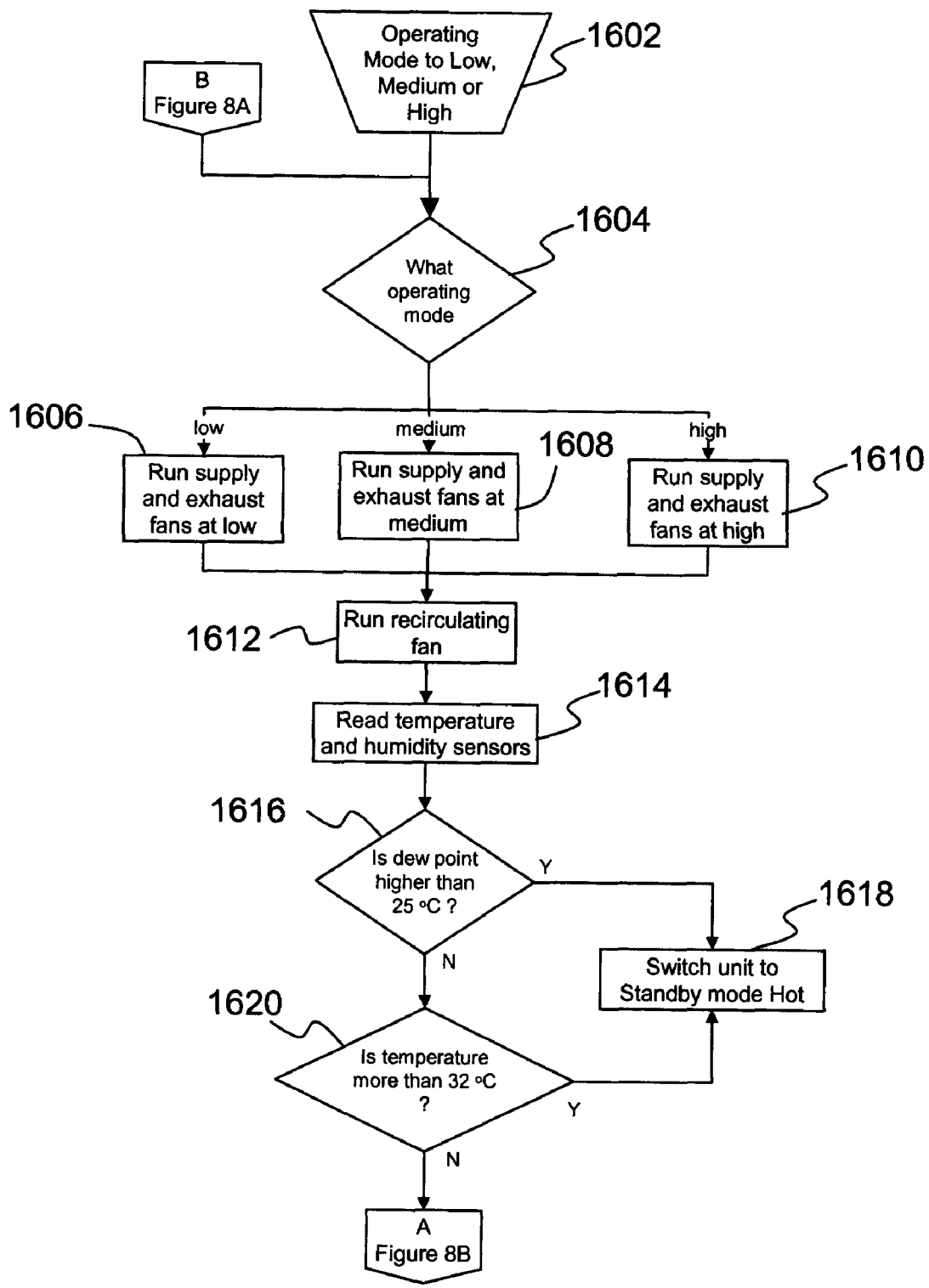
FIGS. 8A and 8B are a flow chart depicting the operation of the controller of the system of FIG. 1.
Figure 8B:
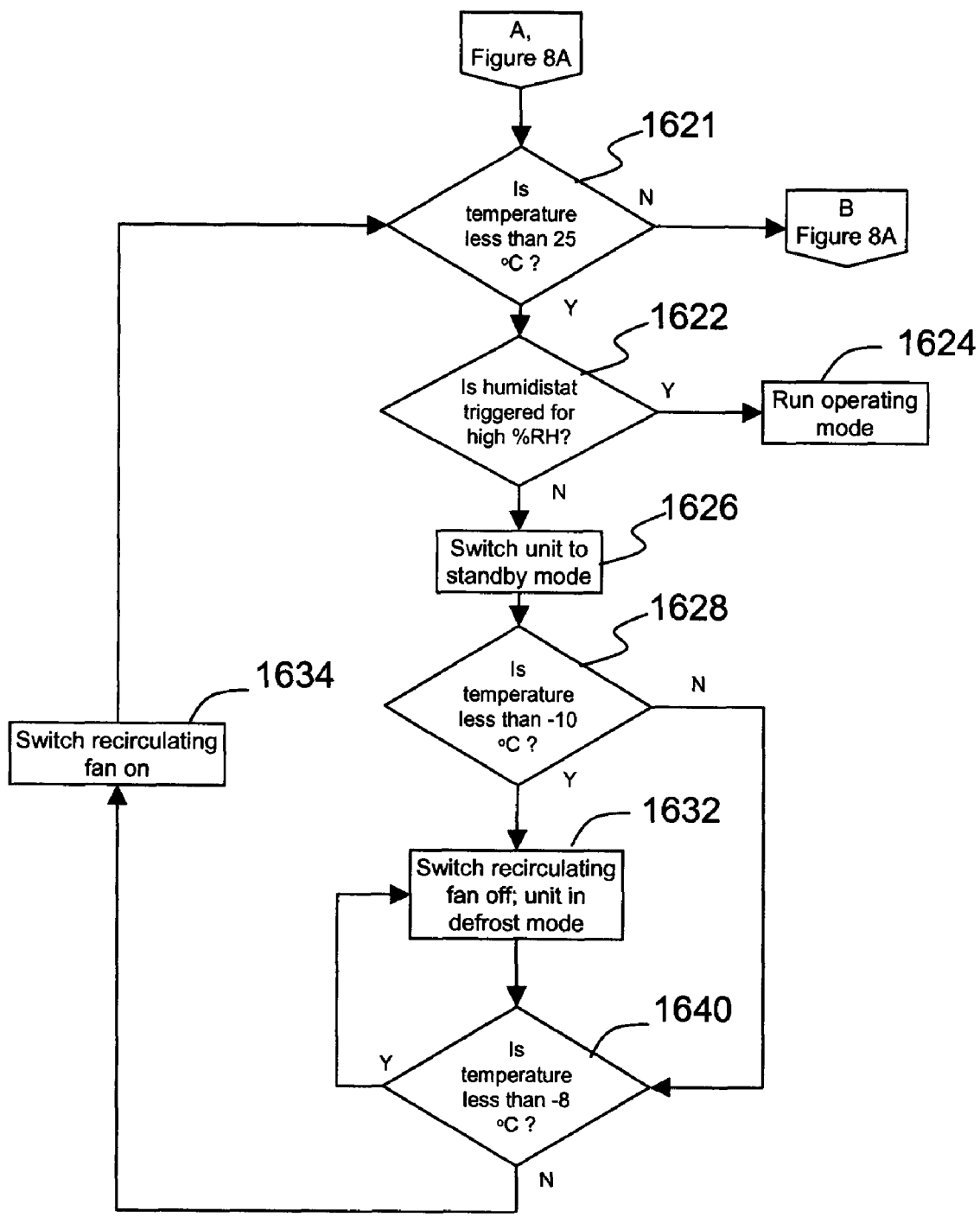

In operation, in accordance with one exemplary embodiment of the present invention and referring to the examples in FIG. 8 and Tables 2 and 3, the operating mode of the system 10 is set manually at low, medium or high 1602. Depending on what operating mode the system is at 1604, the supply fan 34 and exhaust fan 38 is set at low 1606, medium 1608 or high 1610, respectively. The re-circulating fan 36 is also run 1612. The temperature sensors 42 and 43 and the humidity sensor 44 are read 1614. Based on the temperature and the humidity reading, the dew point can be calculated. If the dew point is higher than 25° C., the system will be switched to standby mode hot 1618. If the dew point is lower than 25° C. and the temperature is higher than 32° C., the system will also be switched to standby mode hot 1618. Otherwise if the temperature 1621 is higher than 25° C. and lower than 32° C., the system will go back to read the temperature and humidity sensors, starting at checking operating 1604. If the temperature 1621 is lower than 25° C., and the humidistat is indicating higher relative humidity 1622, the system runs the operating mode 1624. If the humidistat is indicating low relative humidity 1622, the system will be switched to standby mode 1626. If the temperature is lower than −10° C. 1628, the re-circulating fan will be switched off 1632, and the system enters defrost mode. Otherwise if the temperature is higher than −8° C. 1640, the circulating fan 36 is switched on 1634. Table 1 provides an overview of the system operating conditions.

TABLE 1

| Operating Conditions | |
| --- | --- |
| Outside Temperature: | Min. −35° F. |
| | Max. 115° |
| Inside Temperature: | Min. 60° F. |
| | Max. 95° F. |
| Humidity: | Min. 10% RH |
| | Max. 100% RH |

Table 2 provides a summary of the air changes per day provided by the system 10 for a typical dwelling.

TABLE 2

| Modes | |
| --- | --- |
| Standby Mode Hot: | (70 cfm exhaust/110 cfm supply) |
| Standby Mode Cold: | (70 cfm exhaust/70 cfm supply) |
| Operating Modes: | (Installation Settable) |
| Low | (90 cfm) |
| Medium | (110 cfm) |
| | 8.6 Changes/Day for 2300 ft² (1150 ft² basement) House |
| | 7.0 Changes/Day for 2800 ft² (1400 ft² basement) House |

TABLE 2-continued

| Modes | |
| --- | --- |
| High | (140 cfm) |
| | 9.0 Changes/Day for 2800 ft² (1400 ft² basement) House |
| | 7.0 Changes/Day for 3600 ft² (1800 ft² basement) House |
| | 6.6 Changes/Day for 3800 ft² (1900 ft² basement) House |

Table 3 provides a summary of the switching points in the controller 40.

TABLE 3

| Switching Points | |
| --- | --- |
| Condition 1: | Fresh Air at 25° C. or more Dew Point Temperature Switch to Standby Mode Hot with 2° C. change to switch back to operating |
| Condition 2: | Fresh Air at 32° C. or More Switch to Standby Mode Hot with 2° C. change to switch back to operating |
| Condition 3: | Fresh Air at 25° C. to −10° C. Upstairs Humidistat to control Operating Mode or Standby Mode Cold if % RH high Humidistat triggers Operating Mode if % RH low open circuit Standby Mode Cold |
| Condition 4: | Fresh Air at −10° C. or Less Switch Recirculation Fan Off with 2° C. change to switch back on |
| Condition 5: | Fresh Air at (Temp. and Humidity Sensors are before cores) −10° C. or less As illustrated in FIG. 2, temperature and humidity sensors 42, 44 are located before the enthalpy exchange core and sub-core. |

While particular embodiments of the present invention have been shown and described, changes and modifications may be made to such embodiments without departing from the true scope of the invention.

What is claimed is:

1. An energy recovery and humidity control system comprising:
an enclosure comprising:
a plurality of ports capable of connecting to a plurality of ducts;
an enthalpy exchange core defining a first part of a first path for a first air stream, and a second path for a second air stream; the first path and the second path exchanging heat and humidity between the first air stream and the second air stream;
a heat exchange sub-core defining a second part of the first path for the first air stream, and a third path for a third air stream; the first path and the third path exchanging heat between the first air stream and the third air stream; the heat exchange sub-core comprising a first plurality of passages and a second plurality of passages; the first plurality of passages and the second plurality of passages defining a cross-flow of the first air stream and the third air stream,
wherein the second path is in communication with a third port of the plurality of ports and a fourth port of the plurality of ports, and the third path is in communication with the third port and a fifth port of the plurality of ports, and
wherein the second port supplies air to a first space, the third port receives air from a second space with lower temperature or humidity compared to the first space, the fifth port supplies heat exchanged air to the second space with lower temperature or humidity, and the fourth port exhausts air;

fans for circulating the first air stream, the second air stream and the third air stream; and a controller for controlling the fans and regulating the flows of the first air stream, the second air stream and the third air stream.

2. The energy recovery and humidity control system according to claim 1, wherein the first part and the second part of the first path are in tandem, and the first path is in communication with a first port of the plurality of ports and a second port of the plurality of ports.

3. The energy recovery and humidity control system according to claim 2, wherein the first port receives a fresh air supply, and the second port supplies air.

4. The energy recovery and humidity control system according to claim 1, wherein the enthalpy exchange core further comprises a first plurality of corrugated passages, and a second plurality of corrugated passages, the first plurality of corrugated passages and the second plurality of corrugated passages defining a cross-flow of the first air stream and the second air stream; each of the plurality of corrugated passages being defined by a plurality of angularly disposed wall portions and moisture permeable sheets.

5. The energy recovery and humidity control system according to claim 4, wherein the first plurality of corrugated passages is oriented orthogonally to the second plurality of corrugated passages.

6. The energy recovery and humidity control system according to claim 1, wherein each of the passages is defined by a first air impermeable sheet, a second air impermeable sheet and a pair of spaced apart wall portions; said first air impermeable sheet and said second air impermeable sheet allowing transfer of heat between the first plurality of passages and the second plurality of passages.

7. The energy recovery and humidity control system according to claim 6, wherein the first plurality of passages is oriented orthogonally to the second plurality of passages.

8. The energy recovery and humidity control system according to claim 1, wherein the heat exchange in the heat exchange sub-core occurs by utilizing cross flow of the first air stream and the third air stream.

9. The energy recovery and humidity control system according to claim 1, wherein the heat and humidity exchange in the enthalpy exchange core occurs by utilizing cross-flow of the first air stream and the second air stream.

* * * * *